United States Patent [19]

Carn

[11] 3,977,690

[45] Aug. 31, 1976

[54] TRAILER, PARTICULARLY FOR TRANSPORTING AND LAUNCHING BOATS

[76] Inventor: Patrick Carn, Route de Benodet, 29000 Quimper, France

[22] Filed: Jan. 3, 1975

[21] Appl. No.: 538,306

[30] Foreign Application Priority Data

Jan. 9, 1974  France .................. 74.00643

[52] U.S. Cl. .............. 280/47.13 B; 280/414 R
[51] Int. Cl.² ........................................ B60P 3/10
[58] Field of Search ............ 280/414 RA, 47.13 R, 280/47.13 B, 47.18, DIG. 7; 9/1 T

[56] References Cited
UNITED STATES PATENTS

| 2,347,947 | 5/1944 | Hamilton | 280/47.13 R |
| 2,966,368 | 12/1960 | Engnell | 280/47.13 B |
| 3,125,351 | 3/1964 | McDonough | 280/47.13 B |
| 3,771,809 | 11/1973 | Carn | 9/1 T X |

Primary Examiner—M. H. Wood, Jr.
Assistant Examiner—R. Schrecengost
Attorney, Agent, or Firm—Weiser, Stapler & Spivak

[57] ABSTRACT

A trailer is formed of a core with upper sloping surfaces having protruding bosses engageable by angled protrusions from load-bearing arms. The core is placed between the trailer wheels, which are preferably wider than they are high. The arm protrusions can be turned to engage the bosses in different ways to produce different load-bearing configurations.

14 Claims, 3 Drawing Figures

TRAILER, PARTICULARLY FOR TRANSPORTING AND LAUNCHING BOATS

This invention relates to a transport trailer, and particularly to one suitable for transporting and launching boats.

The invention finds its most constructive application in transporting and launching small boats, weighing preferably between 50 and 100 kg.

Boat launching trailers are known which are formed of a chassis or carrying frame comprising an arched truss, whose extremities are connected by a wheel-bearing axle. The truss and the axle together form a quadrilateral in the vertical plane. As a result, a substantial part of the truss is parallel to the wheel axle. On the portion parallel to the wheel axle, the truss supports adjustable load-bearing arms whose separation can be adjusted by engagement in a set of anchoring holes provided in the truss.

The principal drawback of this structure is that it positions the center of gravity of the load being carried well above the arm supporting truss, thereby reducing the stability of the over-all assembly.

A further disadvantage of this structure is that it is difficult to fabricate, because of the shaping of the truss and the complicated assembly of arms and truss.

Accordingly, the present invention has as it principal object the alleviation of one or more of these drawbacks.

Another object is to provide a trailer of simpler construction, which provides a lower center of gravity for the load being carried, and which is capable of carrying single-hull boats, as well as multi-hulled ones of the catamaran type or of other complex cross-sections.

These and other objects which will appear are achieved in accordance with the invention by utilizing a trailer adapted for the transportation of loads and particularly for the transportation and launching of boats, which comprises a pair of wheels that are wider than they are high, supported by a common axle, and a pair of adjustable load-support arms. Both the wheel-bearing axle and the load-bearing arms are supported from a unitary core which is rigid and which occupies only a small space between the wider-than-high wheels.

For further details, reference is made to the discussion which follows, in the light of the accompanying drawings, wherein.

Figure 1:
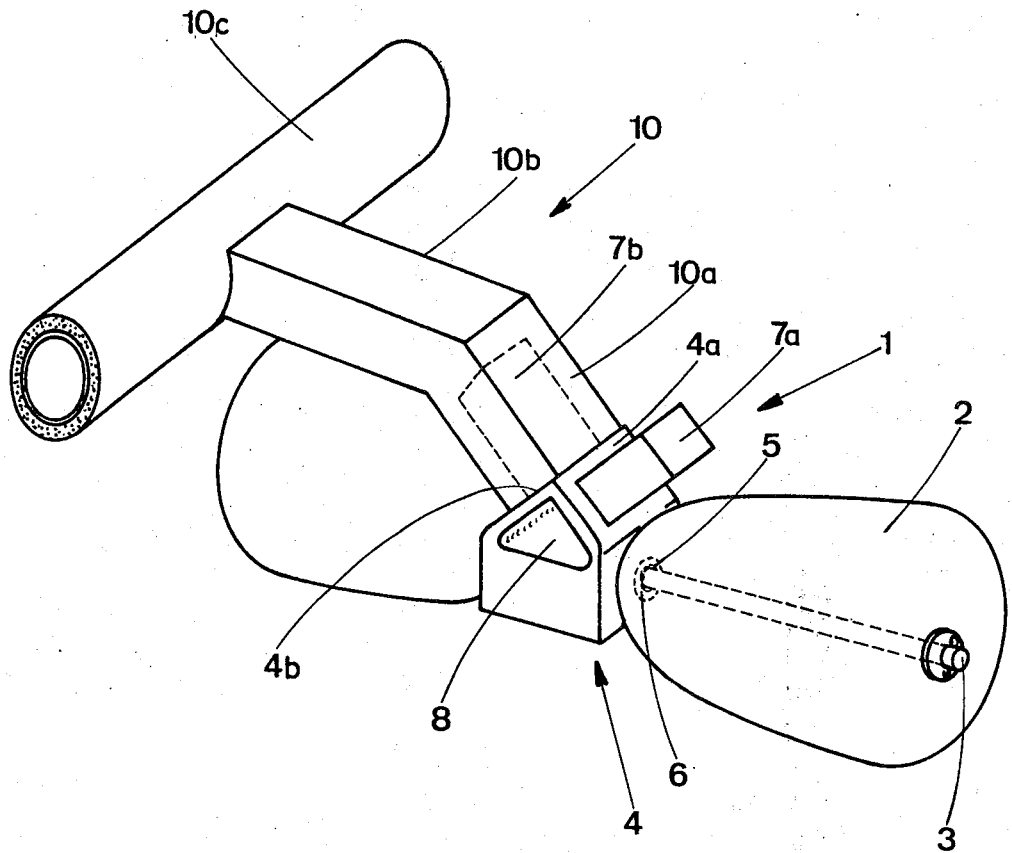
FIG. 1 is a perspective view of an embodiment of such a trailer, but showing only one of the load-bearing arms in order to facilitate comprehension.

In accordance with the invention and as shown in the drawings, the trailer is particularly adapted for the transportation and launching of boats of relatively low weight, ranging, for example, from 50 to 100 kg.

Referring now to the drawings, these show the trailer generally designated by reference numeral 1. This trailer comprises a pair of wheels 2 having a wide tread to facilitate movement over all sorts of terrain, including yielding soil. These wheels are mounted on a common shaft 3. The trailer is provided with load-bearing arms generally designated by reference numeral 10 and described in further detail below.

It is an important characteristic of the invention that the wheel-carrying axle 3 and the load-bearing arms 10 (of which only one is shown in FIG. 1, as previously noted) are supported by a rigid, unitary core 4. This core 4 is small enough to fit in the space between the two wheels 2. The core may be of generally cubical form and may be constructed either by spot-welding or casting. The core 4 is traversed by a horizontal passage 5, through which extends the wheel-carrying axle 3 which is preferably journalled in bearings 6.

The top of the core is provided with two supporting surfaces 4a and 4b which are sloped so as to converge at a peak. Bosses 7a, 7b extend from the middle of these supporting surfaces. Mating protrusions from arms 10 are mounted on these bosses by simple sliding engagement. The bosses 7a, 7b, and the corresponding engaging protrusions 10a from the arms are of polygonal shape so as to prevent rotation of arms 10 after their sliding engagement.

It is another feature of the invention that each load-bearing arm has two segments 10a, 10b, forming a small dihedral angle with each other. In the particular embodiment illustrated, this angle may be of the order of 20°.

On the other hand, the arm-supporting bosses 7a, 7b each protrude at an angle of about 45°. This combination of dihedral angle of the arms and angle of the arm-supporting bosses provides an advantage which is illustrated in FIGS. 2 and 3.

Figure 2:
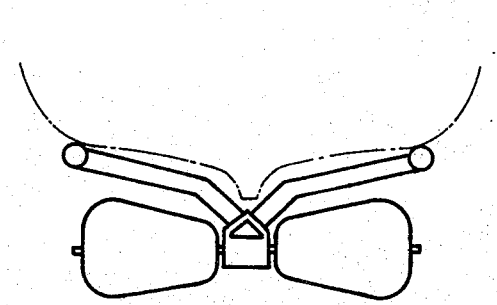
FIG. 2 is an elevation of the trailer, showing it adapted for transportation of a standard, single-hull boat.

In FIG. 2, arms 10 are placed in the position corresponding to that of FIG. 1. This makes possible the transporting of a single-hull boat of keel type, which can be accommodated between the lower segments of arms 10, near the core. This, in turn, makes it possible to appreciably lower the center of gravity of the load being carried.

Figure 3:
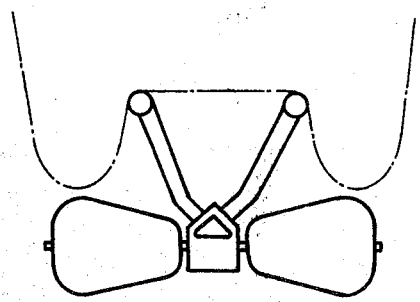
FIG. 3 is an elevation of the trailer showing it adapted for carrying a catamaran-type boat.

In FIG. 3, the arms 10 are rotated by 180° relative to the position which they occupy in FIG. 2. This has the effect of bringing closer together and elevating the load-bearing elements 10c of these arms. This makes possible the transporting of a vessel of catamaran type.

It will also be noted that core 4 has a channel 8 located above passage 5. This channel may, for example, be used to attach a traction cable or drawbar.

This arrangement, utilizing bearing core 4, has the advantage of eliminating the previously known chassis, and of being simpler to construct, while simultaneously providing improved stability.

It will also be noted that this arrangement makes it possible to couple together several individual trailers to form a transport assembly. Such coupling may be effected either by utilizing a wheel bearing axle common to several pairs of wheels, or by using coupling members to join together two or more elements 10c of arms 10, respectively forming part of separate trailers.

It will be understood that the invention is not limited to the specific applications or embodiments disclosed above, but also encompasses other embodiments which will occur to those skilled in the art without departing from the inventive concept.

I claim:

1. A transport and launching trailer comprising:
a pair of wheels carried by an axle;
a pair of adjustable load-bearing arms; and
a rigid, unitary core supporting both said axle and said arms, and occupying the space between said wheels, the core having convergingly sloping upper surfaces, each said surface having a protruding boss adapted to be slideably engaged by a mating protrusion from one of said load-bearing arms.

2. The trailer of claim 1, wherein said wheels are wider than they are high.

3. The trailer of claim 1, wherein said core is traversed by a horizontal passage haing bearings for said axle.

4. The trailer of claim 1, wherein said boss is polygonal, so as to prevent rotation of said engaged mating protrusion.

5. The trailer of claim 1, wherein each said load-bearing arm protrusion has two segments inclined at a small dihedral angle relative to each other.

6. The trailer according to claim 5, wherein each of said bosses protrudes at an angle different from said dihedral angle.

7. The trailer of claim 6, wherein said boss angle is about 45°.

8. The trailer of claim 5, wherein said dihedral angle is about 20°.

9. The trailer of claim 6, wherein each said bearing arm is engageable upon a respective one of said bosses in one of two positions rotationally displaced from each other by 180°, thereby providing either low and relatively widely spread arms, or high and relatively closely spaced arms.

10. The trailer of claim 9, wherein said arms are adapted for carrying a single-hull boat when low and widely spread, and a multi-hull boat when high and closely spaced.

11. The trailer of claim 1, wherein said core has an aperture above said axle passage for the attachment of trailer pulling means.

12. A transport and launching trailer comprising:
a pair of wheels carried by an axle;
a pair of adjustable load-bearing arms; and
a rigid, unitary core supporting both said axle and said arms, and occupying the space between said wheels, the core having divergingly protruding bosses, each adapted to be slideably engaged by a mating protrusion from one of said load-bearing arms.

13. The trailer of claim 12, wherein the bosses and protrusions are so constructed that each protrusion is adapted to matingly engage its respective boss in either of two different angular relationships.

14. The trailer of claim 13, wherein the two angular relationships differ by substantially 180°.

* * * * *